US006337710B1

(12) United States Patent
Watkins

(10) Patent No.: US 6,337,710 B1
(45) Date of Patent: Jan. 8, 2002

(54) GRAPHICAL VIDEO EDITING SYSTEM FOR REGENERATION OF BITSTREAMS

(75) Inventor: Daniel Watkins, Saratoga, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 08/874,085

(22) Filed: Jun. 12, 1997

(51) Int. Cl.[7] ............... H04N 17/00; H04N 11/04; H04N 5/93; G06F 3/00
(52) U.S. Cl. ............... 348/180; 348/192; 348/193; 348/416; 348/722; 345/328; 386/52; 386/55; 386/64
(58) Field of Search ............... 345/328; 348/180, 348/192, 193, 722, 416, 425.1, 571–629; 386/52, 55, 64; 369/83; 714/742; H04N 17/02, 11/04, 5/222

(56) References Cited

U.S. PATENT DOCUMENTS

| | | | | |
|---|---|---|---|---|
| 5,214,500 A | * | 5/1993 | Takayama et al. | 358/10 |
| 5,274,445 A | * | 12/1993 | Overton et al. | 358/139 |
| 5,313,280 A | * | 5/1994 | Straus | 348/181 |
| 5,537,145 A | * | 7/1996 | Miseli | 348/181 |
| 5,557,417 A | * | 9/1996 | Ishii | 358/310 |
| 5,574,500 A | * | 11/1996 | Hamada et al. | 348/180 |
| 5,654,751 A | * | 8/1997 | Richard, III | 348/192 |
| 5,731,839 A | * | 3/1998 | Panaro | 348/416 |
| 5,764,284 A | * | 6/1998 | Stoker | 348/181 |
| 5,787,224 A | * | 7/1998 | Itoh et al. | 386/52 |
| 5,798,788 A | * | 8/1998 | Meehan et al. | 348/180 |
| 5,926,226 A | * | 7/1999 | Proctor et al. | 348/422 |
| 5,959,690 A | * | 9/1999 | Toebes, VIII et al. | 348/578 |
| 5,966,121 A | * | 10/1999 | Hubbell et al. | 345/328 |
| 5,983,022 A | * | 11/1999 | Watkins et al. | 395/708 |
| 6,034,731 A | * | 3/2000 | Hurst, Jr. | 348/423 |
| 6,044,397 A | * | 3/2000 | Eleftheriadis et al. | 709/217 |
| 6,057,882 A | * | 5/2000 | Van Den Branden Lambrecht et al. | 348/192 |
| 6,230,295 B1 | * | 5/2001 | Watkins | 714/742 |
| 6,233,253 B1 | * | 5/2001 | Settle et al. | 370/474 |
| 6,233,356 B1 | * | 5/2001 | Haskell et al. | 382/243 |

* cited by examiner

Primary Examiner—Michael Lee
Assistant Examiner—Paulos M. Natnael
(74) Attorney, Agent, or Firm—Conley, Rose & Tayon

(57) ABSTRACT

A graphical video editing system that allows manipulation of images for input to the video encoding and decoding process. The debugging of video encoders and decoders is aided by user controlled editing of problem areas in test images, and the graphical video editing system is coupled directly to the video encoder or decoder being debugged so that the effects of the editing can be immediately observed. This system advantageously provides a speedup in the debugging process by simplifying the detection of problem areas and providing a fast method for narrowing the possible causes of image flaws. Broadly speaking, the present invention contemplates a graphical video editing system for regeneration of bitstreams. The system comprises an encoder module, a decoder module, a display editor module and a display. The encoder module is configured to receive an input image and to convert the input image into an encoded bitstream. The encoder module is coupled to provide the encoded bitstream as an input bitstream to the decoder module, which is configured to convert the input bitstream into a decoded image. The display editor module is coupled to receive the decoded image from the decoder module and show it on the display. The display editor module is further configured to receive an image edit for the decoded image. The system may further comprise a bitstream manager module coupled to the display editor module to receive the decoded image and the image edit. The bitstream manager module is configured to responsively provide an edited image as the input image to the encoder module.

19 Claims, 4 Drawing Sheets

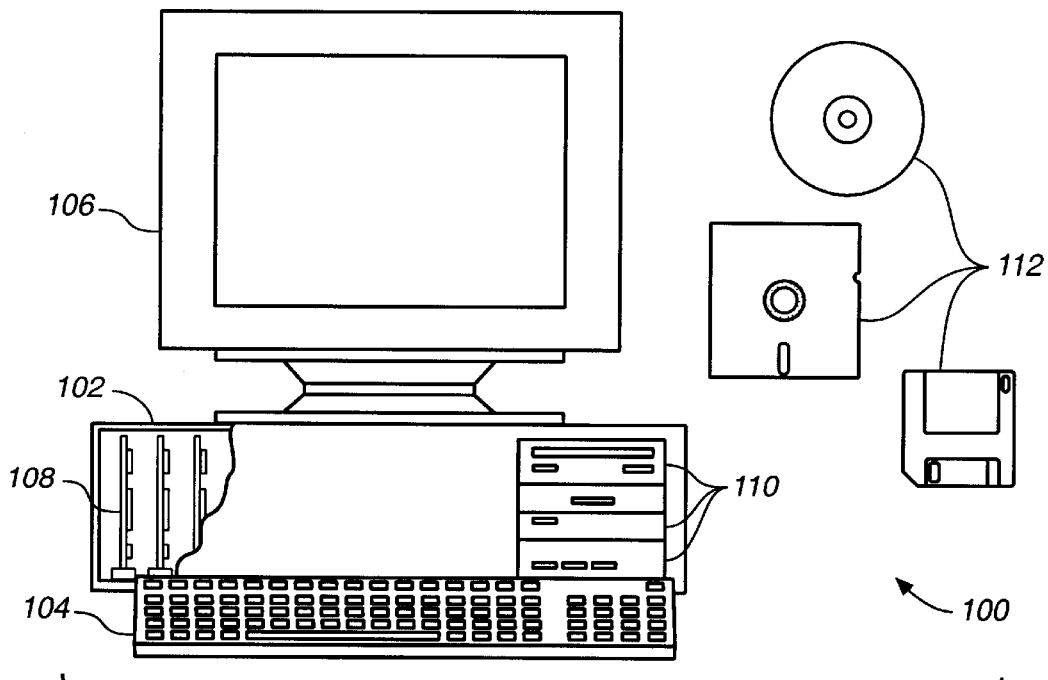
FIG._1
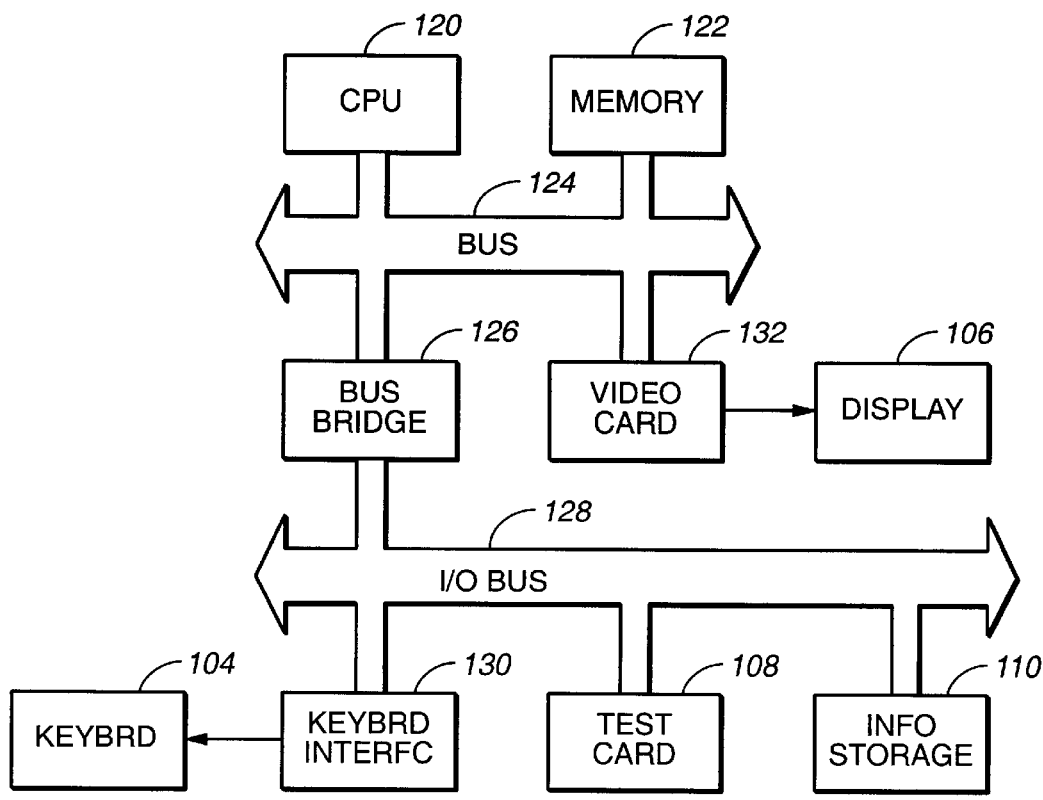
FIG._2

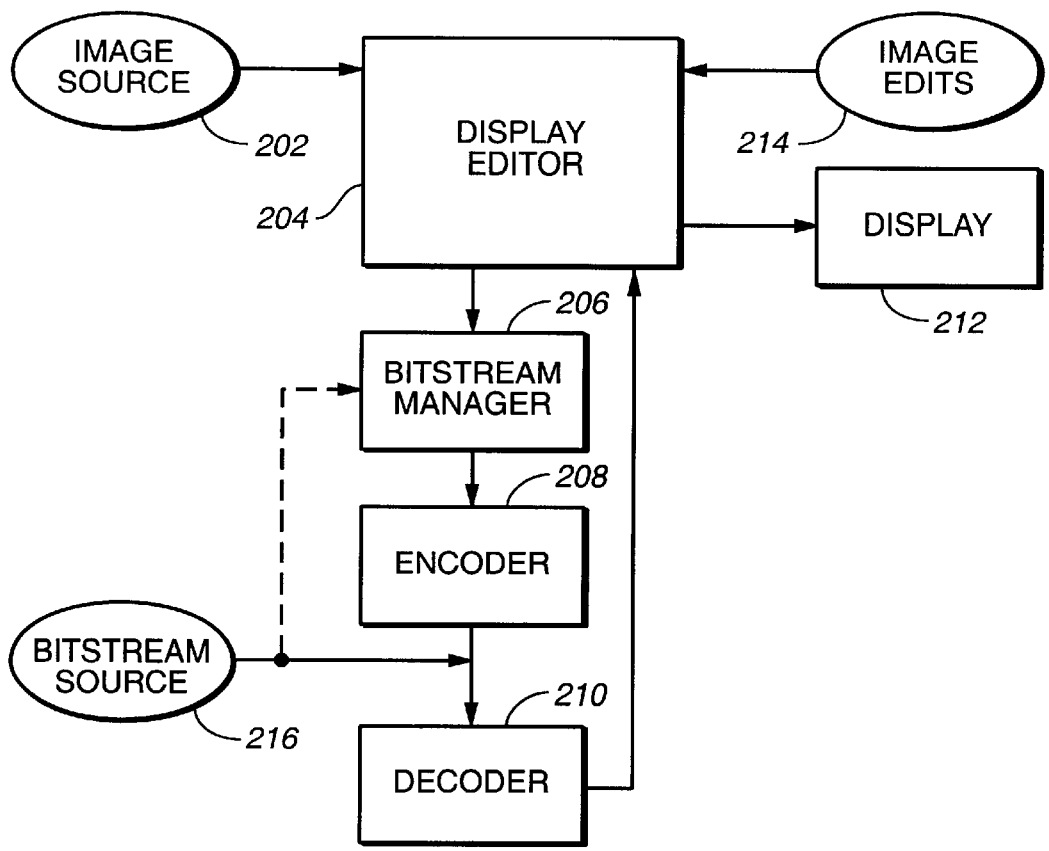
FIG._3
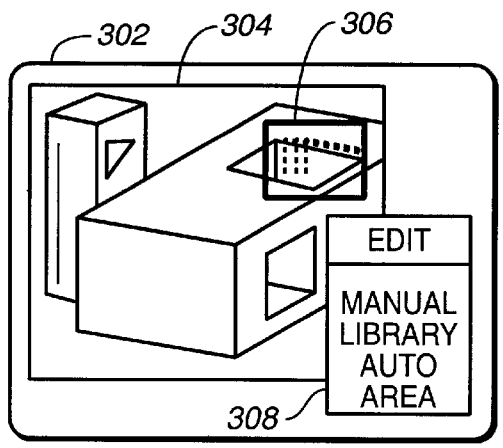
FIG._4
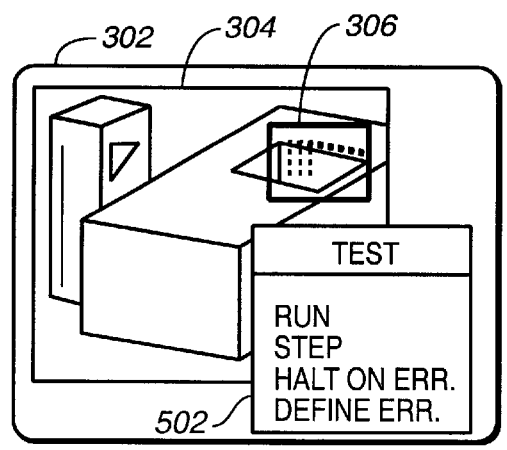
FIG._5

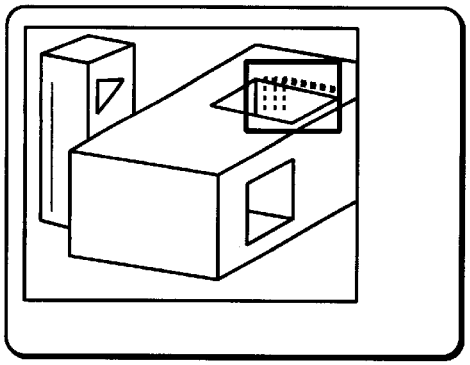
FIG._6A
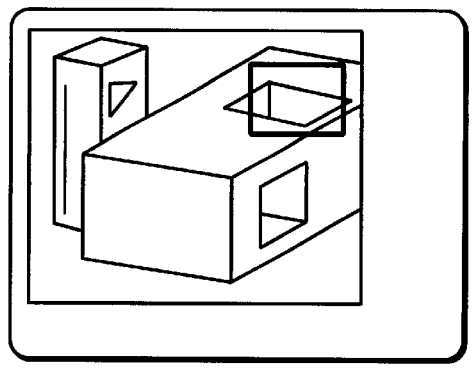
FIG._7A
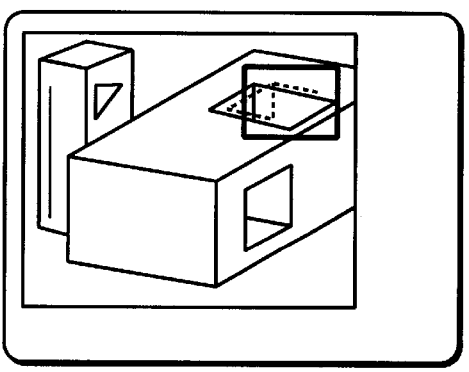
FIG._6B
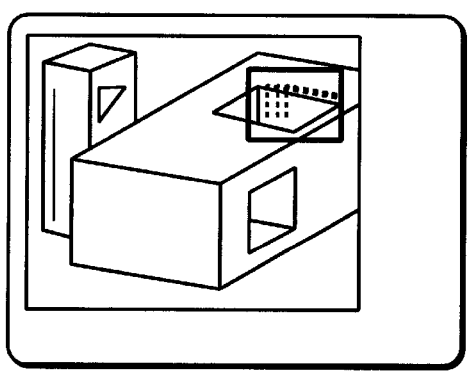
FIG._7B
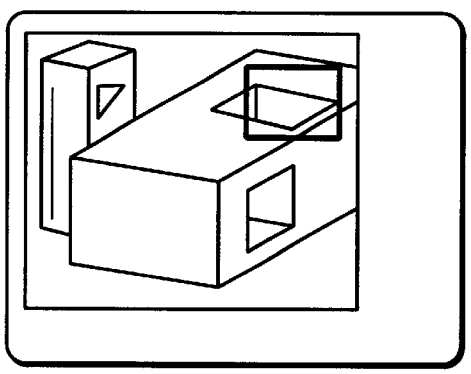
FIG._6C
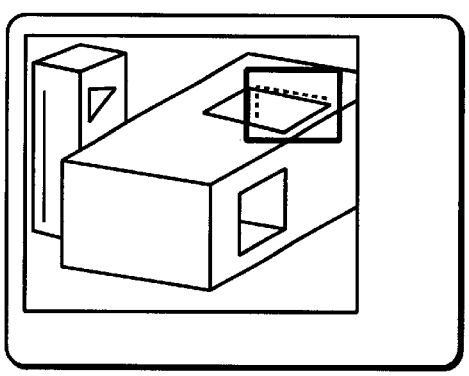
FIG._7C
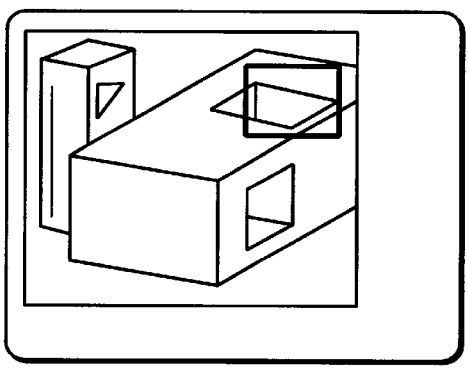
FIG._6D

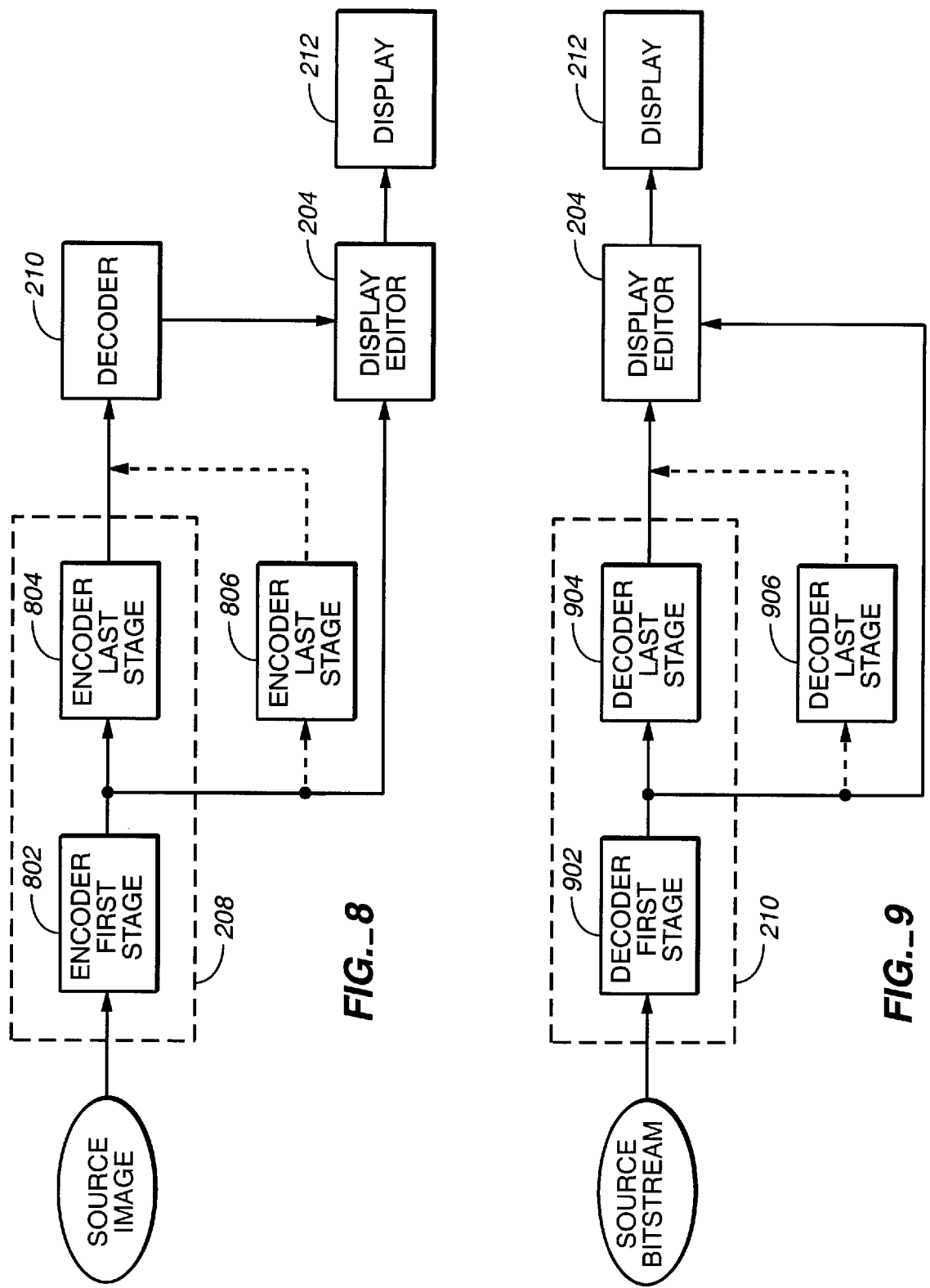

GRAPHICAL VIDEO EDITING SYSTEM FOR REGENERATION OF BITSTREAMS

BACKGROUND OF THE INVENTION

1. Field of the Invention

This invention relates to the field of video editing systems, and in particular to a system for debugging video encoders and decoders.

2. Description of the Related Art

Digital video devices require the use of image compression. JPEG, MPEG, and DVD are related compression standards for image compression which make storage of images and image sequences feasible. They all share some common techniques, such as dividing the image into 8×8 square blocks of pixels, compressing the blocks using the discrete cosine transform, grouping the blocks into macroblocks, grouping the a macroblocks into slices, and grouping the slices into an image. The MPEG and DVD standards also include provisions for encoding images relative to other images in an image sequence for greater compression.

Digital video products such as DVD, JPEG, and MPEG encoders/decoders are data stream processing devices, i.e. they operate on a sequential stream of data. The data streams being operated on are encoded with one or more levels of data compression. The testing and debugging of the sophisticated encoding and decoding algorithms can take an enormous amount of effort due to the sheer number of rule situations that can arise and the range of valid (and invalid) input data streams that may be generated and decoded. In general the testing methods involve authoring a library of test inputs, and then running the library through the device. These two steps are typically performed separately in different environments. When errors are found, the debugging process typically involves searching for commonality between test inputs that reveal the errors to determine the characteristics of the errors. New test inputs may then be created to further define and locate the cause of the error. This process is arduous and lengthy. A system which provides feedback for the adjustment of the test inputs to provide fast, interactive debugging would greatly enhance productivity by reducing the time and effort necessary for testing.

SUMMARY OF THE INVENTION

The problems outlined above are in large part solved by a graphical video editing system that allows manipulation of images for input to the video encoding and decoding process. The debugging of video encoders and decoders is aided by user controlled editing of problem areas in test images, and the graphical video editing system is coupled directly to the video encoder or decoder being debugged so that the effects of the editing can be immediately observed. This system may advantageously expedite the debugging process by simplifying the detection of problem areas and providing a fast method for narrowing the possible causes of image flaws.

Broadly speaking, the present invention contemplates a graphical video editing system for regeneration of bitstreams. The system comprises an encoder module, a decoder module, a display editor module and a display. The encoder module is configured to receive an input image and to convert the input image into an encoded bitstream. The encoder module is coupled to provide the encoded bitstream as an input bitstream to the decoder module, which is configured to convert the input bitstream into a decoded image. The display editor module is coupled to receive the decoded image from the decoder module and show it on the display. The display editor module is further configured to receive an image edit for the decoded image. The system may further comprise a bitstream manager module coupled to the display editor module to receive the decoded image and the image edit. The bitstream manager module is configured to responsively provide an edited image as the input image to the encoder module.

BRIEF DESCRIPTION OF THE DRAWINGS

Other objects and advantages of the invention will become apparent upon reading the following detailed description and upon reference to the accompanying drawings in which:

FIG. 1 illustrates a general purpose computer which is configurable as a graphical video editing system;

FIG. 2 illustrates an internal architecture for the general purpose computer shown in FIG. 1;

FIG. 3 is a functional block diagram of a graphical video editing system;

FIG. 4 illustrates an editing interface implemented by a display editor module shown in FIG. 3;

FIG. 5 illustrates a testing interface implemented by a display editor module shown in FIG. 3;

FIG. 6A–6D illustrate a result comparison function implemented by a display editor module shown in FIG. 3;

FIG. 7A–7C illustrate a sequence context function implemented by a display editor module shown in FIG. 3;

FIG. 8 is a block diagram of the partial display function for debugging an encoder; and FIG. 9 is a block diagram of the partial display function for debugging a decoder.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a general purpose computer 100 is shown. General purpose computer 100 comprises a case 102 coupled to a keyboard 104 and a monitor 106. Case 102 includes a test card 108 and one or more information storage devices 110 which use one or more storage media 112. General purpose computers are known in the prior art, but general purpose computer 100 is distinguished by its functionality as a graphical video editing system.

The internal architecture of general purpose computer 100 is shown in FIG. 2. The general purpose computer 100 comprises a CPU (central processing unit) 120 coupled to a memory 122 via a local bus 124. The local bus is also coupled to a video card 132 which controls display 106. A bus bridge 126 couples an I/O bus 128 to the local bus 124. The I/O bus 128 is coupled to various I/O (input/output) devices including the keyboard 104 via a keyboard interface 130, the test card 108, and the information storage device 110.

After placing a storage medium 112 holding software modules (described further below) in information storage device 110, a user uses keyboard 104 to instruct CPU 120 to transfer the software modules from storage medium 112 to memory 122 and thereafter to begin execution of the software modules. The software modules cooperate with one or more of the hardware elements of the system to provide a graphical video editing system for the debugging of video encoders and decoders.

Turning to FIG. 3, a functional block diagram of the graphical video editing system is shown. It is noted that each of the modules of FIG. 3 may be implemented in hardware or software, but for illustrative purposes the following discussion assumes a softwarebased implementation. The system comprises an image source 202, a display editor module 204, a bitstream manager module 206, an encoder module 208, a decoder module 210, a display 212, a source of image edits 214, and a bitstream source 216. The display editor module 204 receives a source image from image source 202 and shows it on display 212. The source image is sent via bitstream manager module 206 to encoder module 208. Encoder module 208 encodes the image into a bitstreanL The decoder module 210 receives the bitstream and decodes it into a decoded image which is forwarded to the display editor module 204. The decoder module 210 can also decode a source bitstream from bitstream source 216 and forward the decoded image to display editor module 204. Any of the images received by the display editor module 204 can be shown on display 212. In response to the images shown on the display, image edits 214 may be provided to the display editor module 204 which forwards them with the image to bitstream manager module 206. Bitstream manager module 206 combines the edits with the image to form a new input image for encoder module 208.

The image source 202 is typically an archive of stored images and image sequences, but it may also take the form of a video camera or computer graphics generator. The display editor module 204 is a graphical user interface which accepts images and image edits, which initiates encoding/decoding processes, and which facilitates interactive debugging by showing and allowing editing of decoded images. The bitstream manager module 206 may be similar to the system disclosed in U.S. patent application 08/38,798 issued Nov. 11, 1999, Pat. No. 5,983,022 titled "A method for managing data streams for comprehensive verification of circuits, devices and systems," filed Apr. 10, 1997, whose inventors are Daniel Watkins, Sobha Varma, and Shat Mar. This application is incorporated herein by reference in its entirety. As a module, it provides an infrastructure for the handling and manipulation of images in a compressed format. The bitstream manager module 206 can operate on raw image data, but it can also operate on condensed profiles which represent image data and thereby achieve faster and more efficient processing. Use of bitstream manager module 206 for editing images provides additional speed gain in the debugging process.

The encoder module 208 has more than one embodiment. When the graphical video editing system is being used to debug a decoder chip, the encoder module 208 comprises a software model of an encoder running on CPU 120. When an encoder chip is being debugged, the encoder module 208 comprises the encoder chip. The encoder chip is placed on or coupled to test card 108 in general purpose computer 100, where it can receive image data produced by bitstream manager module 206 running on CPU 120. The encoder chip is typically comprised of encoder stages, and often includes provisions for providing intermediate results. As is discussed further below, either the intermediate results or the encoded output bitstream from the encoder chip may be forwarded for further processing.

Similarly, the decoder module 210 has more than one embodiment. When the graphical video editing system is being used to debug a decoder chip, the decoder module 210 comprises the decoder chip. The decoder chip is placed on or coupled to test card 108 in general purpose computer 100, where it can receive an encoded bitstream from encoder module 208 running on CPU 120. The decoder chip is typically comprised of decoding stages, and often provisions are made for providing intermediate results. As is discussed further below, either the intermediate results or the decoded image may be forwarded for further processing. When an encoder chip is being debugged, the decoder module 210 comprises a software model of a decoder running on CPU 120.

Typically, many source images will be stored in a compressed bitstream format to conserve space. Hence the graphical video editing system has provisions for accepting source bitstreams from bitstream source 216. The source bitstreams can be processed directly by decoder module 210 to generate decoded images as shown in FIG. 3. Alternately, the source bitstreams may be processed by bitstream manager module 206 under control of display editor module 204. This latter method may provide some advantages in the image modification portion of the debugging effort.

The functions of the display editor module 204 are now discussed. Turning to FIG. 4, display 212 shows a screen 302 having a decoded image 304, a selected area 306, and edit menu 308. The display editor module provides an editing function which allows modification of a source or decoded image. Decoded image 304 exhibits a decoding flaw in selected area 306. Examples of flaws are noise, residual color from previous images, shadowing, and tearing. A user wanting to experiment with the image to further resolve the problem may edit the selected area of the image using the options on edit menu 308. These include manual editing, substitution, and auto-generation. The user may also refine his selection of the area using an area option.

The manual editing option allows manual manipulation of the selected area. This may include altering colors and adjusting intensities of pixels, blocks, macroblocks, or slices. The substitution option allows selection of a library video element to be substituted for the selected area of the image or for the selected area of a sequence of images. The auto-generation option allows the computer to generate a substitution for the selected area according to user specifications. The user may specify a library element, define a pattern, program an object which moves, or make any combination of these. The area option allows the user to determine the addresses, data values, and hierarchy level of the selected area. The hierarchy level indicates whether the selected area represents a block, a macroblock, or a slice of the picture. The area option provides sub-options including a grid-overlay to determine boundaries of the various hierarchy levels. Other overlays are possible, including overlay on another image with highlighted, colored, or expanded differences between the images. The differences are first determined, then the image in that area is drawn with increased intensity, a specified color, or with the differences increased in magnitude. Another sub-option includes zooming into an area of the image and scanning the image at the increased zoom. Yet another option includes zooming out so that several images are simultaneously available and can be compared.

Turning now to FIG. 5, screen 302 is shown with a test menu 502. A user looking for bugs in an encoder or decoder can use the options on this menu: run, step, halt on error, and define error. The run option causes the (possibly edited) image or sequence of images to be sent through encoder 208 and decoder 210 to generate a decoded image or sequence of decoded images. The step option causes a sequence of decoded images to be displayed on the screen at a slow rate, e.g. one image every five seconds. The halt on error option causes the display of a sequence of decoded images to stop at the first image containing a detected error. The define error option causes the computer to specify the address, data value and hierarchy level of the detected error. Image encoding parameters such as the search range for macro blocks in the inter-frame coding may also be provided by the computer. The user can set parameters to aid in the detection of errors, and these include a location range, a qualitative delta threshold, and an image match threshold. The expected location range for a given pattern can be specified, and if the computer does not detect the pattern in the expected location range, an error is detected. A qualitative measurement of image quality can be made on an image, and if the measurement exceeds the threshold, an error is detected. A reference image for a selected area can be compared against the selected area of an image, and if a difference between the images exists and exceeds a certain threshold, an error is detected. Even if an error is not detected, these values may be provided to the user in response to the selection of an area of the image.

Turning to FIGS. 6A–6D, four screens which may be shown on display 212 are shown. Display editor module 204 allows the user to toggle between images that result from different runs through the encoder module 208 and decoder module 210. FIG. 6A represents the original decoded image with the detected flaw. Altering the encoding method, e.g. choosing a new search parameter or slice size, may result in a second decoded image that has a variation of the flaw as shown in FIG. 6B. The original source image may be called up for comparison as shown in FIG. 6C. Modifying the image sequence, e.g. removing relative motion between the images may largely eliminate the flaw as shown in FIG. 6D. The user may now review what has been learned about the flaw by toggling through these images and thereby narrow the range of possible causes.

As shown in FIGS. 7A–7C which represent screens that may be shown on display 212, the display editor module 204 also allows the user to view adjacent images in the sequence and compare them. For images of reasonable size, the three images may be viewed simultaneously on one screen, in a "super-zoom-out" mode. Alternatively, data characterizing the three images may be shown. The display editor module 204 can detail the image types (such as I, P, or B), the size of the bitstream representations, the compression ratio, the qualitative delta measurement, and an image matching measurement for each of the images. The hierarchy levels, data values, and addresses of the selected areas can be provided by the display editor module 204. The display editor module 204 also allows comparisons between the images. FIG. 7A represents an I image (an independently compressed image), FIG. 7B represents a B image (a bi-directionally interpolated image between FIGS. 7A and 7C), and FIG. 7C represents a P image (an image predictively encoded relative to FIG. 7A).

Turning now to FIG. 8, the graphical video editing system's provisions for the display of partially encoded data are illustrated. Under control of display editor module 204, bitstream manager module 206 provides a source image to encoder module 208. The encoder module 208 includes an encoder first stage 802 and an encoder last stage 804. The bitstream provided by the encoder last stage 804 is decoded by decoder module 210 and the resulting completely hardware encoded image may be shown by display editor module 204 on display 212. Partially encoded data from an intermediate point between the encoder first stage 802 and the encoder last stage 804 is obtained from encoder module 208, and may be displayed in byte form by display editor module 204 on display 212. Alternatively, a software implementation 806 of the encoder last stage may be used to complete the encoding of the partially encoded data. In this case, the resulting bitstream is processed by decoder module 210 and shown by display editor module 204 on display 212. A comparison of this image with the completely hardware encoded image can then be made.

FIG. 9 shows the graphical video editing system's provisions for the display of partially decoded data. A source bitstream is provided to the decoder module 210, which includes a decoder first stage 902 and a decoder last stage 904. The completely hardware decoded image provided by decoder last stage 904 is shown by display editor module 204 on display 212. Partially decoded data from an intermediate point between the decoder first stage 902 and the decoder last stage 904 is obtained from decoder module 210, and may be displayed in byte form by display editor module 204 on display 212. Alternatively, a software implementation 906 of the decoder last stage may be used to complete the decoding of the partially decoded data. In this case the resulting image is shown by display editor module 204 on display 212. A comparison of this image with the completely hardware decoded image can then be made.

Numerous variations and modifications will become apparent to those skilled in the art once the above disclosure is fully appreciated. For example, this method may be applied to generalized data streams rather than simply bitstreams as described. It is intended that the following claims be interpreted to embrace all such variations and modifications.

What is claimed is:

1. A graphical video editing system for regeneration of bitstreams, wherein the system comprises:
   an encoder module configured to receive an input image and to convert the input image into an encoded bitstream;
   a decoder module configured to receive an input bitstream and to convert the input bitstream into a decoded image, wherein the encoder module is coupled to provide the encoded bitstream as the input bitstream to the decoder module;
   a display editor module coupled to receive the decoded image from the decoder module and configured to receive an image edit for the decoded image;
   a display coupled to the display editor module, wherein the display editor module is configured to show the decoded image on the display;
   a bitstream manager module coupled to the display editor module, wherein the display editor module is configured to provide the decoded image and the image edit to the bitstream manager module, wherein the bitstream manager module is configured to responsively provide an edited image as the input image to the encoder module.

2. The graphical video editing system of claims 1, wherein the display editor module is configured to receive a source image as a decoded image.

3. The graphical video editing system of claim 1, wherein the decoder module is configured to receive a source bitstream as an input bitstream.

4. The graphical video editing system of claim 1, wherein the encoder module includes an encoder first stage and an encoder last stage, and wherein the encoder module is configured to provide partially encoded data from an intermediate point between the encoder first stage and the encoder last stage.

5. The graphical video editing system of claim 4, wherein the display editor module is coupled to receive the partially encoded data and configured to show the partially encoded data in byte form on the display.

6. The graphical video editing system of claim 4, wherein the partially encoded data is coupled to a second encoder last stage which is configured to responsively produce an output bitstream, and wherein the decoder is coupled to receive the output bitstream and convert the output bitstream into the decoded image.

7. The graphical video editing system of claim 1, wherein the decoder module includes a decoder first stage and a decoder last stage, and wherein the decoder module is configured to provide partially decoded data from an intermediate point between the decoder first stage and the decoder last stage.

8. The graphical video editing system of claim 7, wherein the display editor module is coupled to receive the partially decoded data and configured to show the partially decoded data in byte form on the display.

9. The graphical video editing system of claims 7, wherein the partially decoded data is processed by a second decoder last stage which responsively provides the decoded image to the display editor module.

10. The graphical video editing system of claim 1, wherein the image edit is a selected video element from a video element library.

11. The graphical video editing system of claim 1, wherein the image edit is a computer generated pattern.

12. The graphical video editing system of claim 1, wherein the decoded image is one of a sequence of decoded images, and wherein the display editor module is configured to search for flaws in each of the decoded images in the sequence.

13. The graphical video editing system of claim 1, wherein the display editor module is further configured to provide an editing function to a user.

14. The graphical video editing system of claim 13, wherein the editing function comprises a selection option that allows the user to select a portion of the decoded image as it is displayed on the display, and wherein the image edit corresponds to a userselected portion of the decoded image.

15. The graphical video editing system of claim 13, wherein the editing function comprises a manual editing option that allows the user to adjust at least one of a color or an intensity of at least one pixel, block, or macroblock of the decoded image displayed on the display.

16. A system for testing video encoders, wherein the system comprises:
a CPU;
a display coupled to the CPU to show decoded images;
a memory coupled to the CPU and configured to store a set of software modules, wherein the CPU is configured to execute the set of software modules;
a video encoder to be tested; and
a bus coupled to the CPU and the video encoder, and configured to transfer image data from the CPU to the video encoder and encoded bitstream data from the video encoder to the CPU;
wherein the set of software modules executed by the CPU includes:
a decoder module configured to receive the encoded bitstream data and to convert the encoded bitstream data into a decoded image;
a display editor module coupled to receive the decoded image from the decoder module and configured to show the decoded image on the display, and further configured to receive an image edit for the decoded image; and
a bitstream manager module coupled to the display editor module, wherein the display editor module is configured to provide the decoded image and the image edit to the bitstream manager module, wherein the bitstream manager module is configured to responsively provide an edited image as the image data to the video encoder.

17. A system for testing video decoders, wherein the system comprises:
a CPU;
a display coupled to the CPU to show decoded images;
a memory coupled to the CPU and configured to store a set of software modules, wherein the CPU is configured to execute the set of software modules;
a video decoder to be tested, wherein the video decoder is configured to receive encoded bitstream data and to responsively provide decoded image data; and
a bus coupled to the CPU and the video decoder, and configured to transfer encoded bitstream data from the CPU to the video decoder and decoded image data from the video decoder to the CPU;
wherein the set of software modules executed by the CPU includes:
an encoder module configured to receive an input image and to convert the input image into the encoded bitstream data;
a display editor module coupled to receive the decoded image data from the video decoder and configured to show a decoded image on the display, and further configured to receive an image edit for the decoded image; and
a bitstream manager module coupled to the display editor module, wherein the display editor module is configured to provide the decoded image and the image edit to the bitstream manager module, wherein the bitstream manager module is configured to responsively provide an edited image as the image data to the encoder module.

18. The system for testing video decoders as recited in claim 17, wherein the video decoder is further configured to receive encoded bitstream data from a bitstream source.

19. The system for testing video decoders as recited in claim 17, wherein the display editor module is further configured to halt the video decoder and to show a last decoded image on the display if a decoding error is detected.

* * * * *